US010332490B2

(12) United States Patent
Moyer

(10) Patent No.: US 10,332,490 B2
(45) Date of Patent: Jun. 25, 2019

(54) PIANO SYSTEMS AND METHODS FOR THE ENHANCED DISPLAY OF THE HANDS OF A PIANIST

(71) Applicant: William Frederick Moyer, Lee, NH (US)

(72) Inventor: William Frederick Moyer, Lee, NH (US)

( * ) Notice: Subject to any disclaimer, the term of this patent is extended or adjusted under 35 U.S.C. 154(b) by 0 days.

(21) Appl. No.: 14/431,303

(22) PCT Filed: Sep. 23, 2013

(86) PCT No.: PCT/US2013/061714

§ 371 (c)(1),
(2) Date: Mar. 25, 2015

(87) PCT Pub. No.: WO2014/052472

PCT Pub. Date: Apr. 3, 2014

(65) Prior Publication Data

US 2015/0255048 A1 Sep. 10, 2015

Related U.S. Application Data

(60) Provisional application No. 61/705,291, filed on Sep. 25, 2012.

(51) Int. Cl.
*G10C 3/00* (2006.01)
*G03B 17/54* (2006.01)
(Continued)

(52) U.S. Cl.
CPC ............... *G10C 3/00* (2013.01); *G03B 17/54* (2013.01); *G03B 21/54* (2013.01); *G10H 1/0008* (2013.01);
(Continued)

(58) Field of Classification Search
CPC ........................................................ G10C 3/00
See application file for complete search history.

(56) References Cited

U.S. PATENT DOCUMENTS 3,490,328 A * 1/1970 King .................... G03B 21/001 84/169
3,756,716 A * 9/1973 Gitchel .................. G07F 17/30 353/122
(Continued)

FOREIGN PATENT DOCUMENTS

EP 0396488 A1 12/1995
JP 3528003 B2 5/2004
(Continued)

OTHER PUBLICATIONS

Dmitry O. Gorodnichy, Arjun Yogeswaran "Detection and Tracking of Pianist Hands and Fingers" Jun. 2006 CRV'06: Proceedings of The 3rd Canadian Conference on Computer and robot Vision; Publisher: IEEE Computer Society.

*Primary Examiner* — Robert W Horn
(74) *Attorney, Agent, or Firm* — Neifeld IP Law, PC

(57) ABSTRACT

In one embodiment, a method for the enhanced display of the hands of a pianist playing a piano is disclosed, including: (a) recording at least one video stream of at least one hand of a pianist playing a piano; and (b) while the pianist is playing the piano, using at least a portion of the piano as a display for displaying the video stream.

29 Claims, 7 Drawing Sheets

100
179
189
130
140
199
110
120
115

(51) Int. Cl.

| | |
|---|---|
| ***G03B 21/54*** | (2006.01) |
| ***H04N 5/77*** | (2006.01) |
| ***G10H 1/00*** | (2006.01) |

(52) U.S. Cl.

CPC ......... *H04N 5/77* (2013.01); *G10H 2220/005* (2013.01); *G10H 2220/411* (2013.01); *G10H 2220/455* (2013.01)

(56) References Cited

U.S. PATENT DOCUMENTS

| | | | | |
|---|---|---|---|---|
| 5,864,078 | A * | 1/1999 | Koevering | G10C 3/12 84/477 R |
| 6,084,167 | A * | 7/2000 | Akimoto | G10C 3/00 84/477 R |
| 6,288,313 | B1 * | 9/2001 | Sato | G10C 3/02 84/177 |
| 6,288,317 | B1 | 9/2001 | Willis | |
| 6,388,181 | B2 * | 5/2002 | Moe | G09B 15/08 84/470 R |
| 6,982,375 | B2 * | 1/2006 | McGregor | G09B 15/06 84/465 |
| 7,189,909 | B2 * | 3/2007 | Vinoly | G09B 15/00 348/143 |
| 7,361,829 | B2 * | 4/2008 | Uehara | G10G 1/02 84/477 R |
| 7,405,355 | B2 * | 7/2008 | Both | G10H 1/0058 84/645 |
| 7,582,825 | B2 * | 9/2009 | Chien | G09B 15/08 84/477 R |
| 8,445,767 | B2 * | 5/2013 | Brow | A63F 13/06 84/478 |
| 8,502,062 | B2 * | 8/2013 | Mishima | G10H 1/32 84/13 |
| 8,766,077 | B2 * | 7/2014 | Soejima | G09B 5/00 84/470 R |
| 9,122,395 | B2 * | 9/2015 | Engle | G06F 3/04886 |
| 9,576,564 | B2 * | 2/2017 | Yamauchi | G10G 3/04 |
| 2004/0237757 | A1 * | 12/2004 | Alling | G09B 5/065 84/601 |
| 2006/0104600 | A1 | 5/2006 | Abrams | |
| 2013/0068086 | A1 * | 3/2013 | Mittelstadt | G09B 15/003 84/645 |
| 2015/0255048 | A1 * | 9/2015 | Moyer | G03B 21/54 84/462 |
| 2018/0108332 | A1 * | 4/2018 | Moyer | G03B 21/54 |

FOREIGN PATENT DOCUMENTS

| | | | |
|---|---|---|---|
| JP | 2006078863 | A | 3/2006 |
| JP | 4655455 | B2 | 3/2011 |

* cited by examiner

PIANO SYSTEMS AND METHODS FOR THE ENHANCED DISPLAY OF THE HANDS OF A PIANIST

CROSS-REFERENCE TO RELATED APPLICATIONS

This application is a United States National-Stage Application, filed under 35 U.S.C. § 371, of Patent Cooperation Treaty Application Serial No. PCT/US2013/061714, filed on Sep. 25, 2013, which claims the benefit of and priority to U.S. Provisional Patent Application Ser. No. 61/705,291, filed Sep. 25, 2012, the disclosures of both of which are hereby incorporated by reference in their entirety.

TECHNICAL FIELD

The present invention relates to musical performances and, more specifically but not exclusively, to the enhancement of musical performances by improving an audience's ability to visualize one or more aspects of the performance, such as the hands of a pianist.

DESCRIPTION OF THE RELATED ART

At a concert or recital involving piano, both performers and audiences have an interest in the audience being able to watch the pianist's hands. It has conventionally been difficult or impossible for most audience members to do so, except for those who sit on the left side of the concert hall—and, even then, the view of the pianist's hands is limited, particularly for those sitting far from the stage.

Even in a smaller room, such as a classroom or auditorium, many audience members who are seated closely enough to have a good view of the pianist are still unable to see the pianist's hands while the pianist is playing, because the body of the piano itself or the body of the pianist obstructs their view.

Although it is possible to show a performer's hands on a separate, remote screen, such as using a projector, such equipment is not always readily available at all venues, especially in smaller concert halls, theaters, classrooms, and the like.

Moreover, projecting a pianist's hands on a separate screen requires audience members to look elsewhere, taking their eyes off the pianist, and having to choose whether to view either (i) the pianist and the piano or (ii) the screen displaying the pianist's hands. In this scenario, audience members typically must turn their heads back and forth to change views, making simultaneous viewing of the pianist, the piano, and the screen displaying the pianist's hands difficult or impossible.

SUMMARY OF THE INVENTION

To address the problems of the prior art, embodiments of the invention involve using one or more portions of the piano itself, such as the underside of the open lid, or a display attached to or integrated within the piano, as a display for displaying the pianist's hands to an audience. In some embodiments, the invention provides a piano that includes a display for displaying the pianist's hands to the audience. In other embodiments, the invention provides a device or system adapted to be attached to and used with a piano, for displaying the pianist's hands to the audience.

In one embodiment, the present invention provides a method for the enhanced display of the hands of a pianist playing a piano. The method includes: (a) recording at least one video stream of at least one hand of a pianist playing a piano; and (b) while the pianist is playing the piano, using at least a portion of the piano as a display for displaying the video stream.

In another embodiment, the present invention provides a system for the enhanced display of the hands of a pianist playing a piano. The system includes a video recorder and a display. The video recorder is adapted to record at least one video stream of at least one hand of a pianist playing a piano. The display is adapted to use at least a portion of the piano for displaying the video stream while the pianist is playing the piano.

In a further embodiment, the present invention provides an apparatus for the enhanced display of the hands of a pianist playing a piano. The apparatus includes a video recorder and a projector. The video recorder is adapted to record at least one video stream of at least one hand of a pianist playing a piano. The projector is adapted to display the video stream on the underside of the piano lid while the pianist is playing the piano.

In still a further embodiment, the present invention provides a piano with enhanced display of the hands of a pianist. The piano includes a video recorder and a display. The video recorder is adapted to record at least one video stream of at least one hand of a pianist playing the piano. The display is adapted to show the video stream on at least a portion of the piano while the pianist is playing the piano.

DETAILED DESCRIPTION

Figure 1:
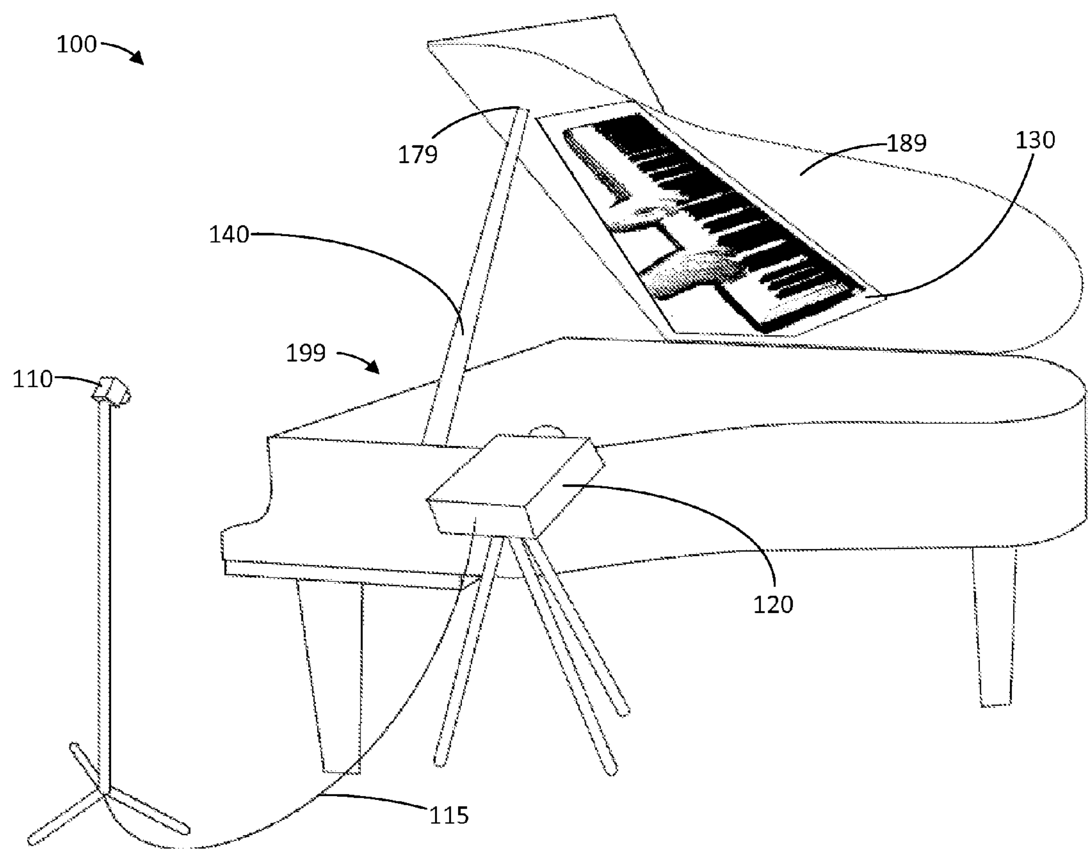
FIG. 1 illustrates an exemplary piano system with enhanced display, in one embodiment of the invention.

FIG. 1 illustrates an exemplary piano system 100 with enhanced display, in one embodiment of the invention, in use with a conventional piano 199. Piano system 100 includes a video camera 110 coupled to a display projector 120 via a video-input feed 115, along with a screen 130 and an extension rod 140.

As shown, video camera 110 is aimed at the keyboard (not visible in the drawing) of piano 199. Video camera 110, which is supported, e.g., by a tripod, is adapted to provide to projector 120, via video-input feed 115, a continuous real-time video stream depicting the keyboard of piano 199. Projector 120, which is supported, e.g., by a tripod, has an output image that is aimed at the underside of the open lid 189 of piano 199.

Screen 130 is affixed to the underside of lid 189 and provides a white background surface for the output image of projector 120.

Extension rod 140 is a rod longer than the pivoting lid-support rod included as part of piano 199 and is desirably used in lieu thereof, to prop open the lid 189 of piano 199 and increase the opening angle beyond the angle intended by the piano manufacturer. This provides several advantages, including a larger viewing surface for the audience and a viewing surface that faces the audience more directly, on the underside of lid 189. Additionally, because of the short distance from projector 120 to piano lid 189, the distance from projector 120 to the bottom of the image is much greater than the distance from projector 120 to the top of the image, which causes the bottom of the image to be relatively larger than the top of the image and creates a "keystone effect." Raising the lid with extension rod 140 evens out these distances and reduces the keystone effect.

Accordingly, in system 100, while the pianist plays, his or her hands are displayed to the audience on screen 130. Audience members can thus see, in a single view, and without having to turn their heads back and forth, (i) the pianist, (ii) piano 199, and (iii) an enlarged view of the pianist's hands on screen 130.

Figure 2:
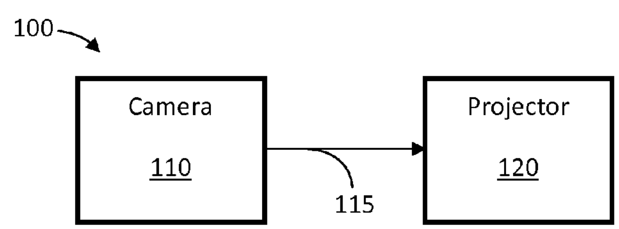
FIG. 2 illustrates a block diagram of the electronic components of the exemplary piano system of FIG. 1.
Figure 4A:
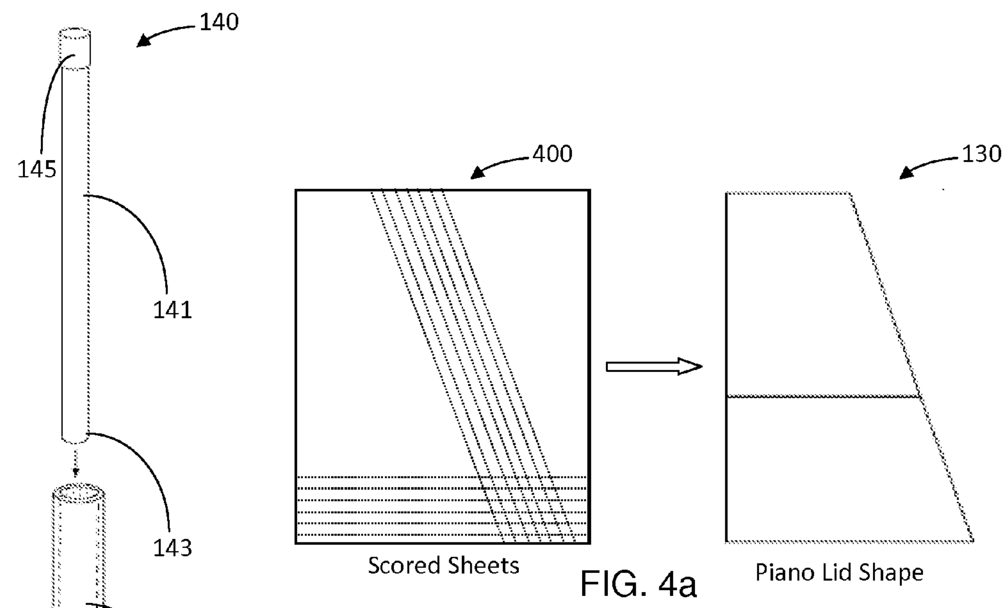
FIG. 4*a* shows a stack of scored sheets used to create a screen, in one embodiment of the invention.
Figure 4A:
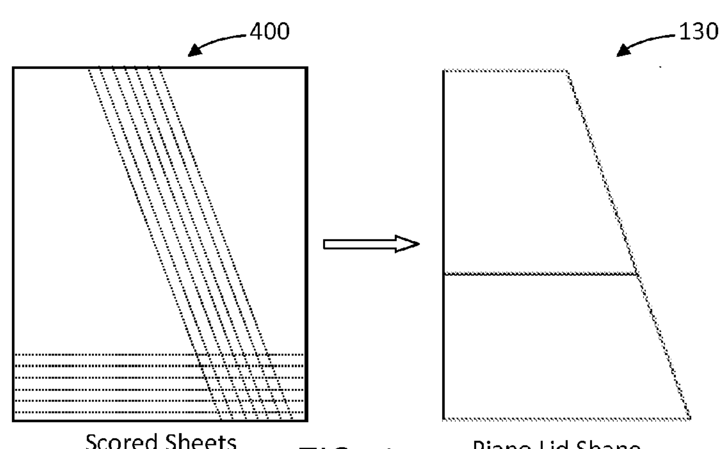
Figure 4B:
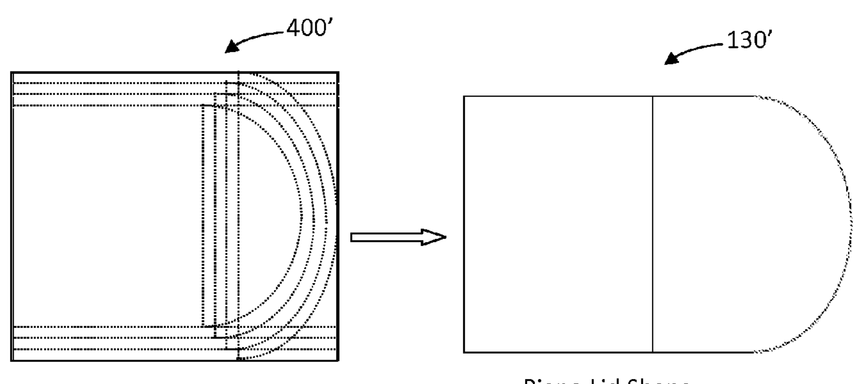
FIG. 4*b* shows a stack of scored sheets used to create an extended screen portion for a horizontal screen, in one embodiment of the invention.

As shown in FIG. 2, video-input feed 115 provides video signals for streaming live video from video camera 110 to display projector 120. Video camera 110 and display projector 120 may, in alternative embodiments, be coupled wirelessly, e.g., via WiFi network, a Bluetooth connection, or the like. Although not shown in FIG. 2, one or more additional video-processing components may be included to permit the inclusion of functionality such as video manipulation (e.g., cropping, skewing, etc.), recording, and the like.

Figure 3:
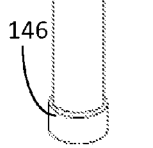
FIG. 3 shows additional construction details of one embodiment of an extension rod.

FIG. 3 shows additional construction details of one embodiment of extension rod 140, although other designs are possible. As shown, extension rod 140 includes a first portion 141 having a rubber tip 145 and a projecting end 143, and a second portion 142 having a rubber tip 146 and a recess 144. Projecting end 143 of first portion 141 is adapted to fit slidably and removably within recess 144 of second portion 142, such that a snug and rigid friction fit is created when first portion 141 and second portion 142 are fully joined. In use, one end of extension rod 140 is placed in a lid-support rod recess 179 within the underside of lid 189, such that lid 189 rests on extension rod 140, while the other end of extension rod 140 is propped against a suitable location within the body of piano 199 (not visible in the drawings), most likely near the base of the pivoting lid-support rod included as part of piano 199. In other embodiments, instead of using an extension rod 140 that entirely replaces the pivoting lid-support rod included as part of piano 199, an extension rod add-on could be used that increases the length of the pivoting lid-support rod included as part of piano 199.

FIG. **4*a* shows a stack of scored sheets 400 used to create screen 130, in one embodiment of the invention. Sheets 400 are made from an electrostatic material, such as dry-erase whiteboard film. As shown, sheets 400 are scored to match the contours of variously-sized piano lids and also to match the projected image of the piano keyboard, such that a view of the pianist's hands can be displayed generally vertically and generally parallel to the continuous hinge of the piano lid, at a location near the continuous hinge edge of the piano lid (as shown, e.g., in FIG. 1). In this manner, a single set of sheets 400 can be used with different pianos, such as by a traveling pianist who is using different pianos at different venues. The pianist simply removes one of scored sheets 400, tears or cuts it along the scored lines that best match the contours of the desired piano 199 to create a piece of material, which can then be applied by means of static cling to the underside of lid 189 (and/or applied by means of an adhesive, clips, or other means), as shown in FIG. 1**.

FIG. **4*b* shows a stack of scored sheets 400' used to create an extended screen portion 130' for a horizontal screen, in one embodiment of the invention. Sheets 400' are scored to match the contours of variously-sized piano lids and permit the view of the pianist's hands to be generally horizontal and generally perpendicular to the continuous hinge of the piano lid (as shown, e.g., in FIG. 6), whereby both screen 130 and extended screen portion 130' are applied to the underside of lid 189**, either adjacent to one another, or overlapping one another, to create the horizontal screen.

Figure 5:
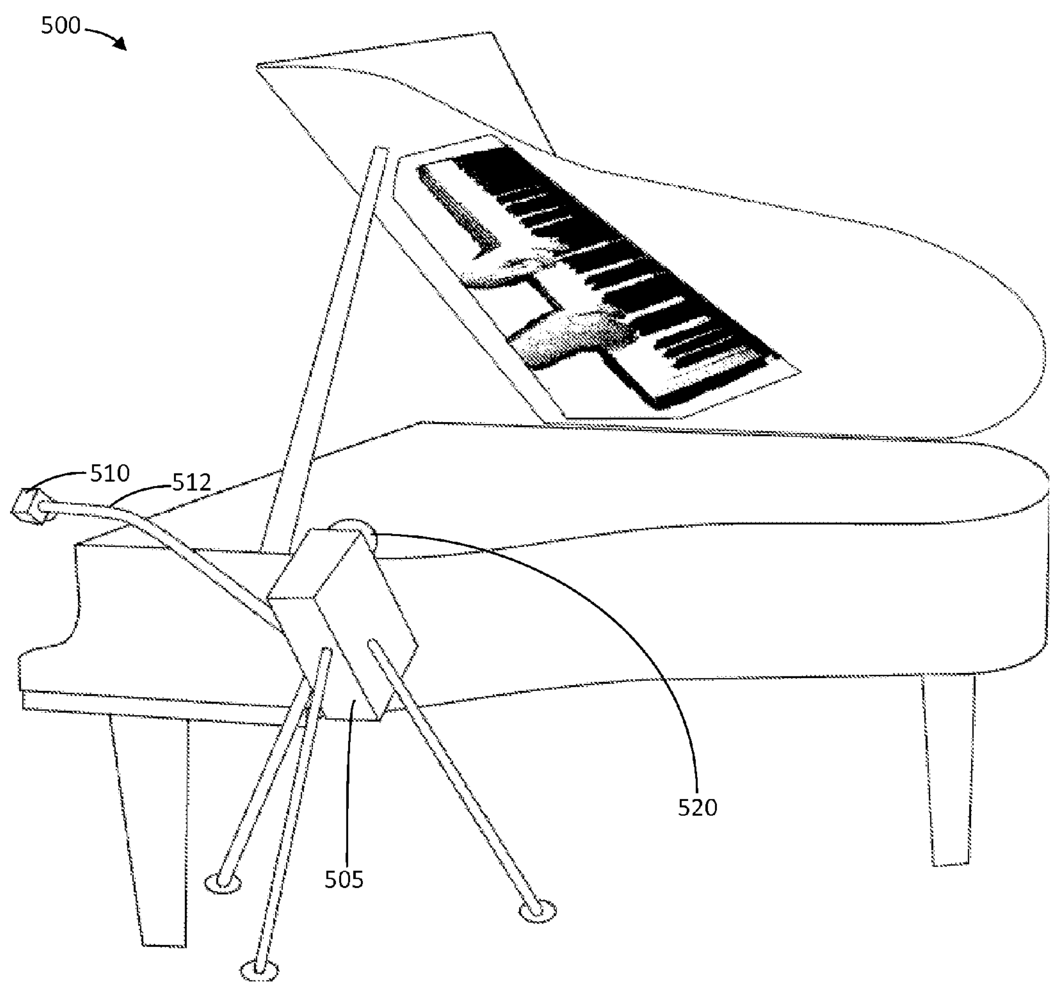
FIG. 5 illustrates another exemplary piano system with enhanced display, in one embodiment of the invention.

FIG. 5 illustrates another exemplary piano system 500 with enhanced display, in one embodiment of the invention. Piano system 500 includes a single integrated portable unit 505 that houses a display projector 520 and has a video camera 110 tethered to unit 505 via a flexible gooseneck arm 512, but in other respects is similar to piano system 100 of FIG. 1 described above. As can be seen, the configuration of FIG. 5 advantageously reduces the number of individual devices, tripods, and wiring employed relative to the configuration of FIG. 1.

Figure 6:
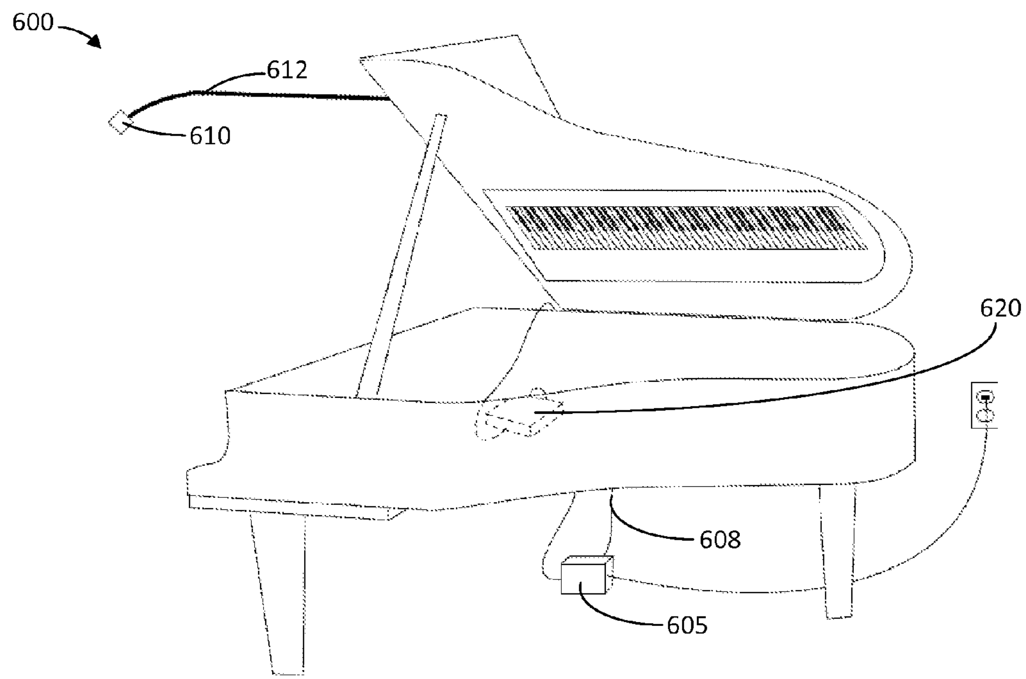
FIG. 6 illustrates another exemplary piano system with enhanced display, in one embodiment of the invention.

FIG. 6 illustrates another exemplary piano system 600 with enhanced display, in one embodiment of the invention. Piano system 600 includes a two-piece projector system that keeps heat and light away from the piano body, e.g., as disclosed in WO2013004742A1, which is incorporated by reference in its entirety herein, but in other respects is similar to piano system 100 of FIG. 1 described above. Piano system 600 includes controller 605, which houses the bulb and fan components of the projector, and projector head 620 coupled to controller 605 via one or more interconnections 608 that may include optical and/or electrical connections. As shown, in this embodiment, a video camera 610 is mounted to the piano lid via a flexible gooseneck arm 612, e.g., to provide an alternative viewing angle.

Figure 7:
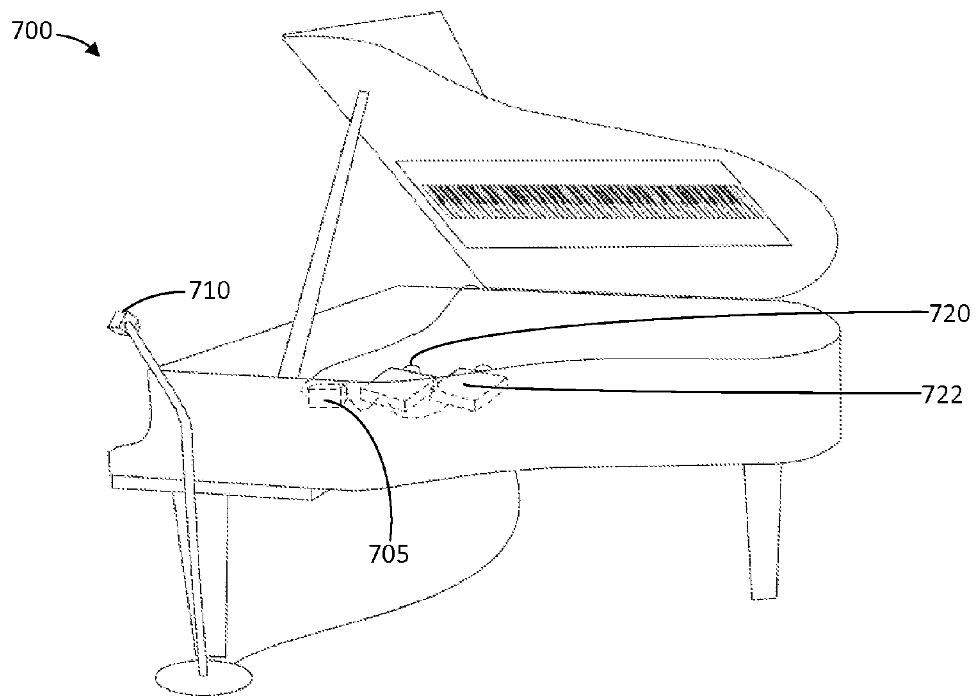
FIG. 7 illustrates another exemplary piano system with enhanced display, in one embodiment of the invention.

FIG. 7 illustrates another exemplary piano system 700 with enhanced display, in one embodiment of the invention. Piano system 700 includes a two-projector system that separates the elongated image of the piano keyboard from a single video camera into two parts and displays those parts adjacent to one another, but in other respects is similar to piano system 100 of FIG. 1 described above. Piano system 700 includes controller 705, which receives streaming video from video camera 710, crops the image into two video streams, and sends those streams to display projectors 720 and 722, respectively. The projected images from projectors 720, 722 are displayed adjacently to form a single contiguous image.

Figure 8:
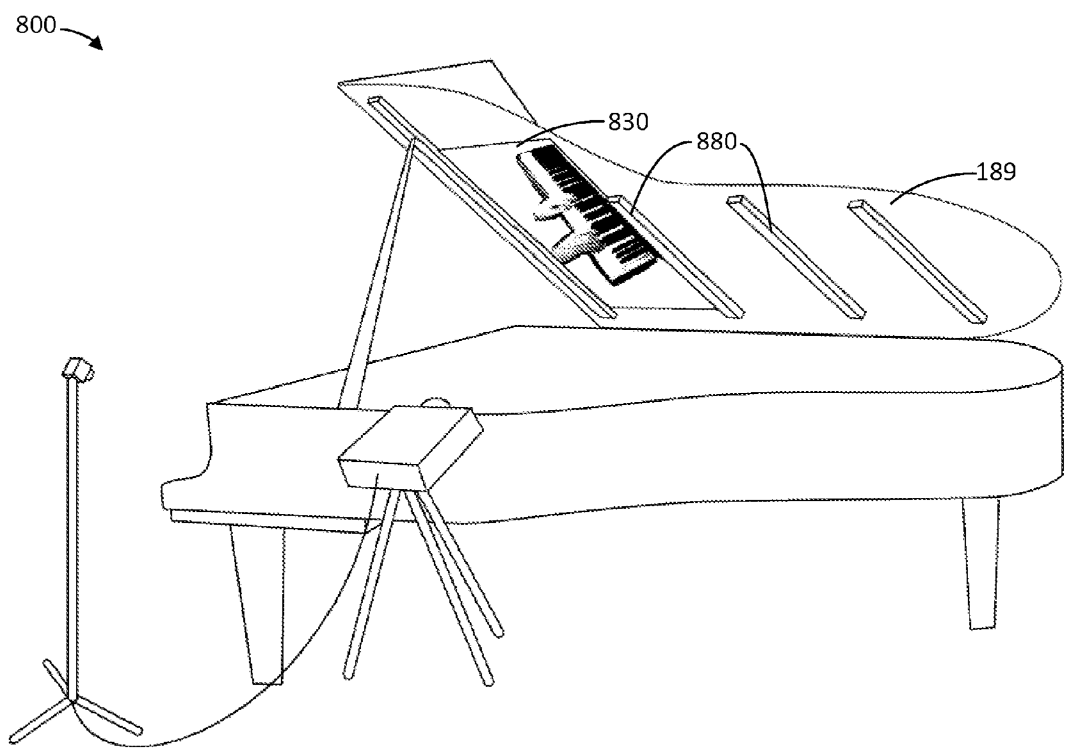
FIG. 8 illustrates another exemplary piano system with enhanced display, in one embodiment of the invention.

FIG. 8 illustrates another exemplary piano system 800 with enhanced display, in one embodiment of the invention. Piano system 800 provides one exemplary method for mounting a screen 830 on the underside of piano lid 189, but in other respects is similar to piano system 100 of FIG. 1 described above. In this embodiment, screen 830 is mounted between a pair of adjacent support ribs 880 of piano lid 189, in vertical fashion, i.e., generally parallel to the continuous hinge of piano lid 189.

Figure 9:
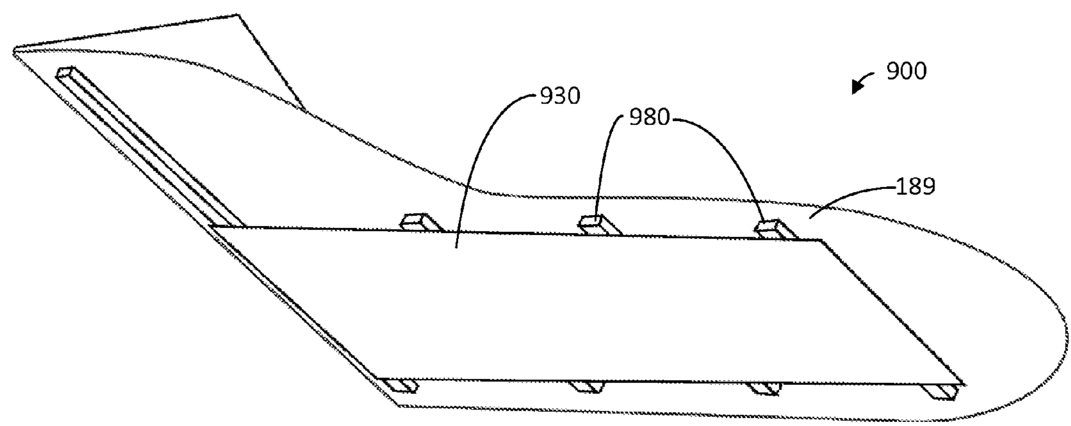
FIG. 9 illustrates another exemplary piano system with enhanced display, in one embodiment of the invention.

FIG. 9 illustrates another exemplary piano system 900 with enhanced display, in one embodiment of the invention. Piano system 900 provides another exemplary method for mounting a screen 930 on the underside of piano lid 189, but in other respects is similar to piano system 100 of FIG. 1 described above. In this embodiment, screen 930 is mounted across and on top of a plurality of adjacent support ribs 980 of piano lid 189, in horizontal fashion, i.e., generally perpendicular to the continuous hinge of piano lid 189.

Figure 10:
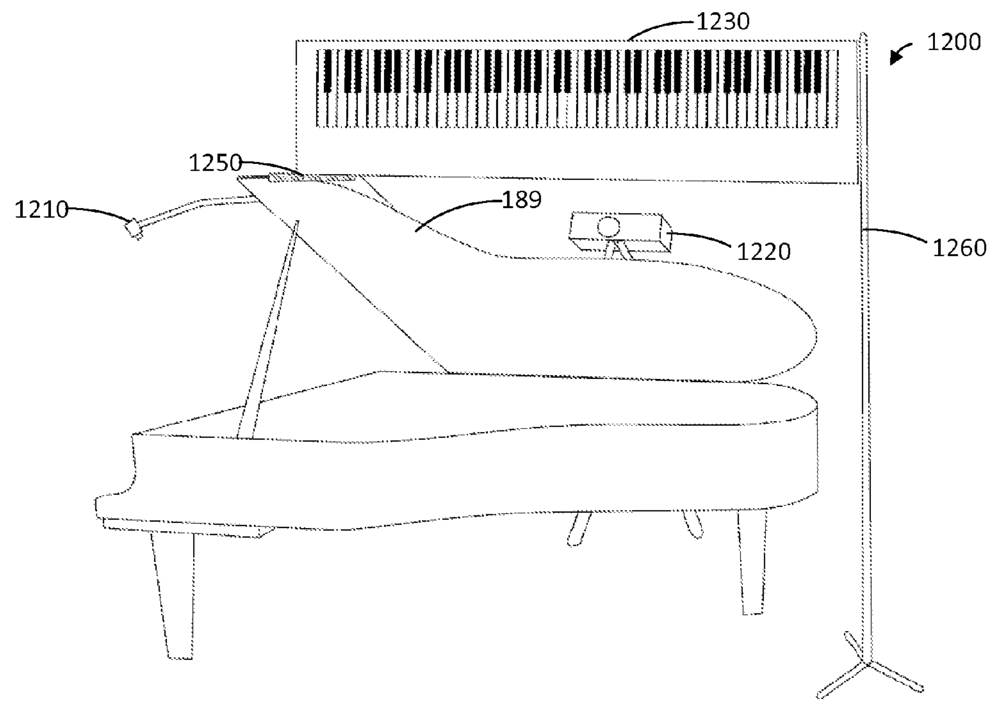
FIG. 10 illustrates another exemplary piano system with enhanced display, in one embodiment of the invention.

FIG. 10 illustrates another exemplary piano system 1200 with enhanced display, in one embodiment of the invention. Piano system 1200 includes a rear-projection display projector 1220 that projects onto a screen 1230 that is in part supported by piano lid 189 at a first attachment point 1250 and in part supported by a support stand 1260, but in other respects is similar to piano system 100 of FIG. 1 described above.

Figure 11:
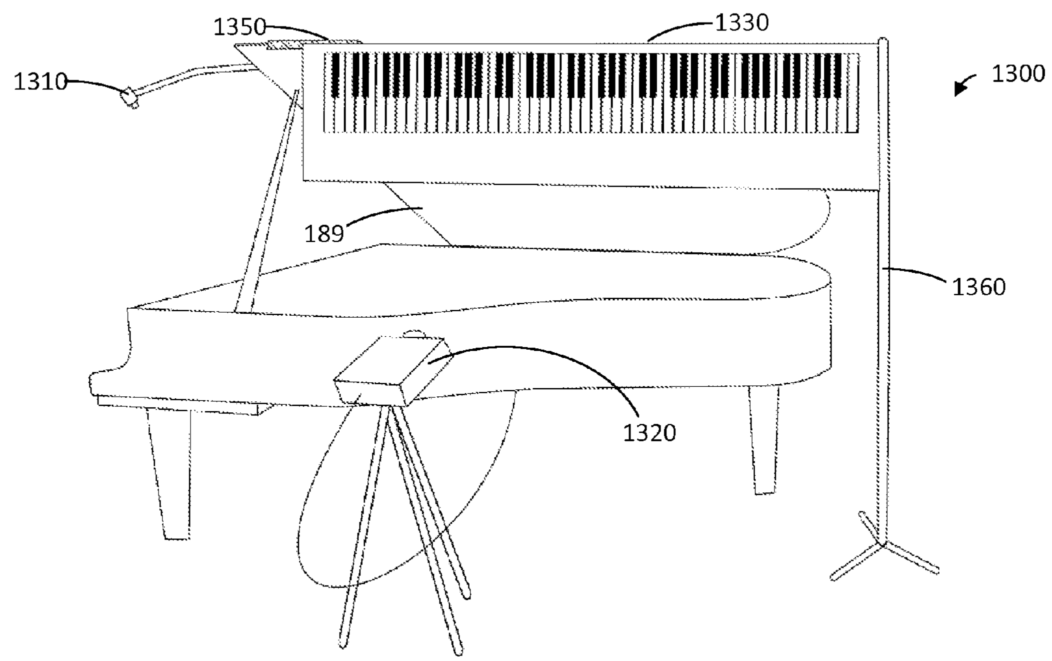
FIG. 11 illustrates another exemplary piano system with enhanced display, in one embodiment of the invention.

FIG. 11 illustrates another exemplary piano system 1300 with enhanced display, in one embodiment of the invention. Piano system 1300 includes a front-projection display projector 1320 that projects onto a screen 1330 that is in part supported by piano lid 189 at a first attachment point 1350 and in part supported by a support stand 1360, but in other respects is similar to piano system 100 of FIG. 1 described above.

Figure 12:
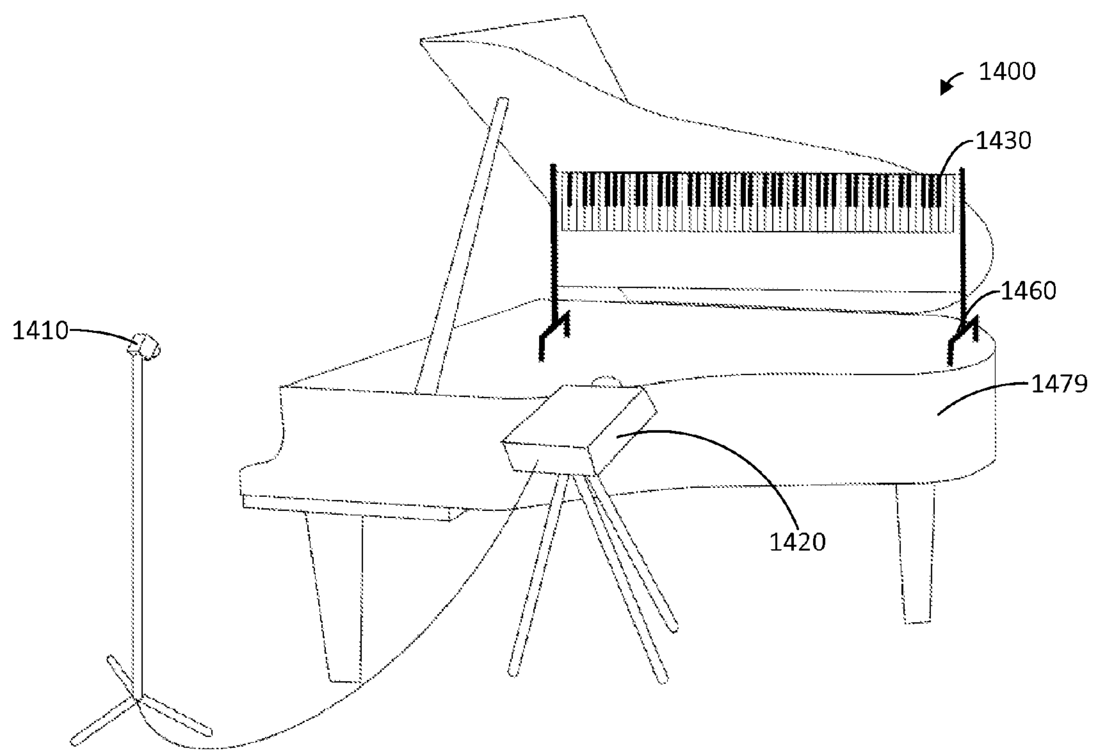
FIG. 12 illustrates another exemplary piano system with enhanced display, in one embodiment of the invention.

FIG. 12 illustrates another exemplary piano system 1400 with enhanced display, in one embodiment of the invention. Piano system 1400 includes a front-projection display projector 1420 that projects onto a screen 1430 that is supported within one or more components of the piano body 1479 by a pair of support stands 1460, but in other respects is similar to piano system 100 of FIG. 1 described above.

Figure 13:
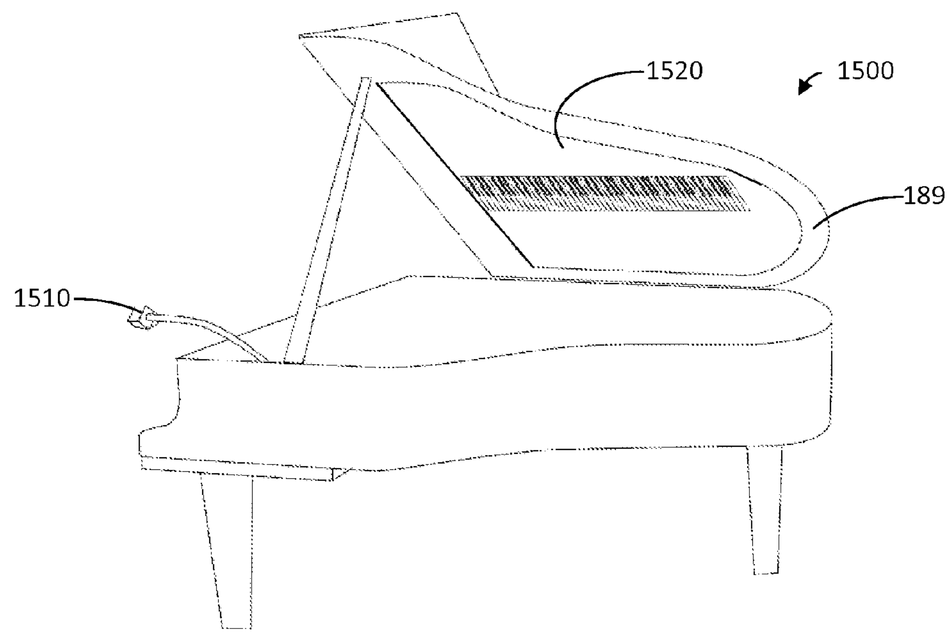
FIG. 13 illustrates another exemplary piano system with enhanced display, in one embodiment of the invention.

FIG. 13 illustrates another exemplary piano system 1500 with enhanced display, in one embodiment of the invention. Piano system 1500 is different from the embodiments discussed above in that the display projector and screen are replaced with a flat panel-type display 1520, such as a liquid crystal display (LCD), organic light emitting display (OLED), or inorganic light emitting display (ILED). Display 1520 may have an irregular shape, e.g., a shape that matches the contours of piano lid 189, as shown in FIG. 13, or a regular shape, such as a rectangle or the like. In this embodiment, display 1520 may be integrated within piano lid 189 as part of a manufactured piano product, as part of a replacement lid for an existing piano, or as a display adapted for attachment to an existing piano lid 189, e.g., via mechanical means, such as clips or straps.

Alternative Embodiments

In alternative embodiments, the video camera may be situated differently and is desirably positioned so as to prevent obscuring the audience's direct view of the pianist and/or piano. For example, the camera may be anchored at one end of the piano keyboard and mechanically suspended above the keyboard, e.g., via a gooseneck support mechanism. Alternatively, the camera may be suspended from the ceiling, on a tripod, or attached via wires or other means. In some embodiments, multiple cameras are used to create multiple video feeds of the piano keyboard, and those multiple feeds are then processed and used to create a single video image for display to the audience. Multiple cameras may be used, e.g., for left and right cameras, as redundant cameras for stability or sharpness enhancement, to permit display-angle changes or zoom changes during performance, and the like. In one embodiment, the various angles and/or various levels of zoom are determined by a computer program that monitors and reacts to the sound waves of the piano and/or the motion of the performer's hands. For example, if the computer notices that the left fingers are moving more than the right, then the camera would zoom in on that hand.

The projector may be disposed on a stand separate from and outside of the piano body, immediately in front of the piano. The projector may also be disposed within the piano body, such as atop an unoccupied region of the metal plate, or in another location that reduces or eliminates the ability of the audience to see the projector while in use. A shelf may be temporarily mounted to the rim or case to hold the projector at a suitable distance from the lid as a projection surface. Alternatively, the projector may be disposed elsewhere, such as suspended from the ceiling or affixed to another surface or component of the piano. In embodiments where the projector is disposed within the piano body, an ultra-short-throw projector can be used, so that the image is magnified substantially at a very short distance, and it is desirable that the projector emit little or no heat that could cause damage to a piano. The connection between the camera and the projector can be wired or wireless.

The screen can be made from a variety of materials and be held onto the underside of the piano lid using a variety of means. In one embodiment, the screen is a relatively thin plastic sheet held on by static cling. In another embodiment, the screen is a plastic sheet that is slightly sticky on one side but not sticky enough to leave a residue on the lid once removed. In another embodiment, the screen is made of cloth that is stretched tight and held on using one or more clips or other fasteners. In another embodiment, the screen is made from whiteboard material. In another embodiment, the screen is a dark gray high-contrast projection screen. Instead of being removable, in some embodiments, the screen is permanently affixed to or integrated into the lid, such as by the piano manufacturer. In this scenario, piano manufacturers could sell pianos that include a system consistent with embodiments of the invention, including an integrated high-contrast projection screen, projector integrated into or attached to the piano, and attached or integrated video camera.

In one embodiment, instead of using a projector and screen, a display panel, such as an LCD, organic or inorganic LED, or plasma display, affixed to or integrated into a portion of the piano itself, is used to display the pianist's hands. The display panel could be rectangular or could alternatively be custom-shaped to conform to the shape of the lid, thereby maximizing usage of the area on the piano lid for display and providing possible alternatives for horizontal, vertical, and diagonal display of the keyboard.

It should be recognized that parts of the piano other than the open lid could alternatively be used as a display. For example, the top of some upright pianos could be used as a display or attachment surface for a display. Alternatively, the side of a grand piano could be used as a display or attachment surface for a display.

Other real-time images could also be shown on the underside of the lid, such as a view of the printed music, other currently playing musicians, images of the pianist's use of the pedals, and the like. Multiple surfaces of the piano could be used concurrently to display the same view, to increase the number of locations from which the performer's hands can be seen. Alternatively, multiple surfaces of the piano could be used concurrently to display different views.

In some alternative embodiments, instead of recording and displaying a two-dimensional image of the pianist's hands, a three-dimensional (e.g., holographic) image of the hands of the pianist is displayed, e.g., directly in front of the piano lid. In one such exemplary embodiment, a screen fabricated from a photorefractive material capable of refreshing holograms in near-real time can be used with an array of regular cameras, each of which views the pianist's hands from a different perspective. The information from those cameras is encoded onto a fast-pulsed laser beam that interferes with another beam that serves as a reference, and the resulting interference pattern is written into the photorefractive polymer, creating and storing the image. Each laser pulse records an individual holographic, three-dimensional pixel in the polymer. The hologram fades away or can be erased by recording a new image, creating a new diffraction structure, and deleting the old pattern. The use of such an arrangement, or another three-dimensional display arrangement, results in the piano becoming a "container" for the display of the pianist's hands, such that an enlarged, three-dimensional image of the pianist's hands appears to be contained and showcased within or near the space defined by the body and lid of the piano.

Tripods for the video camera and/or projector may be used that hide wires within the pole of the tripod (i.e., so that wires enter and exit at only the top and bottom of the tripods), to reduce visual clutter from excess wiring.

It should be recognized that devices consistent with embodiments of the present invention may also have utility with instruments other than pianos, including organs, electric pianos, marimbas, and other instruments having surfaces suitable for the display of an enhanced view of one or more portions of a person playing the instrument.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Although the invention has been set forth in terms of the exemplary embodiments described herein and illustrated in the attached documents, it is to be understood that such invention is purely illustrative and is not to be interpreted as limiting. Consequently, various alterations, modifications, and/or alternative embodiments and applications may be suggested to those skilled in the art after having read this disclosure. Accordingly, it is intended that the invention be interpreted as encompassing all alterations, modifications, or alternative embodiments and applications as fall within the true spirit and scope of this disclosure.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A method for the enhanced display of the hands of a pianist playing a piano having a keyboard and a lid with an underside, the lid having at least an open position and a closed position, the method comprising:

(a) providing an imaging device in a position that is both above and to a side of the keyboard, such that the imaging device has a perspective view comprising the keyboard and at least one hand of the pianist, wherein closer keys appear larger than farther keys;

(b) recording, using the imaging device, at least one video stream comprising at least a portion of the perspective view; and (c) while the pianist is playing the piano, at least one of:

(i) using at least a portion of the underside of the lid of the piano as a display for displaying the video stream;

(ii) using at least a portion of the lid as a support structure for a display for displaying the video stream; and (iii) displaying at least a portion of the video stream within the space defined by the body and lid of the piano, when the lid is in the open position, wherein either:

(1) the keyboard displayed on the display has a trapezoidal shape, and the display's shape conforms to keyboard's trapezoidal shape, such that the display is not rectangular, and the display's shape is trapezoidal, five-sided, six-sided, or curved, such that the displayed trapezoidal keyboard fits within the display, or (2) the display's shape comprises a curve conforming to a curve of the piano lid, such that the display is not rectangular.

2. The method of claim 1, wherein step (d) comprises using a projector to project the video stream on a surface of the underside of the piano lid.

3. The method of claim 2, wherein the display comprises a screen, and the method further comprises:

(e) affixing the screen to the underside of the piano lid to provide a background surface.

4. The method of claim 2, wherein the imaging device is a video camera integrated as a unit into the projector.

5. The method of claim 4, wherein step (c) comprises affixing the screen to the ribs of the piano lid.

6. The method of claim 1, wherein step (b) further comprises operating projector bulb and fan components outside the piano body while operating a projector head inside the piano body.

7. The method of claim 1, wherein the piano lid comprises a flat panel display, and step (b) comprises displaying the video stream on the flat panel display.

8. The method of claim 1, further comprising propping open the piano lid using an extension rod longer than the lid-support rod included as part of the piano, wherein when the pianist uses the lid-support rod, the piano lid is at a first angle, and when the pianist uses the extension rod, the piano lid is at a second angle greater than the first angle, such that the projected video stream is less distorted when the extension rod is used than when the lid-support rod is used to prop up the piano lid.

9. The method of claim 1, wherein step (b) comprises displaying the video stream as a three-dimensional video stream.

10. The method of claim 1, wherein:

the keyboard displayed on the display has an trapezoidal shape, and the display's shape conforms to keyboard's trapezoidal shape, such that the display is not rectangular.

11. The method of claim 10, wherein the display's shape is trapezoidal, five-sided, six-sided, or curved, such that the displayed trapezoidal keyboard fits within the display.

12. The method of claim 1, wherein the display's shape comprises a curve conforming to a curve of the piano lid, such that the display is not rectangular.

13. The method of claim 1, further comprising the steps of:

(d) providing at least one portable stand, (e) affixing the display to the underside of the piano lid and mounting the imaging device and a projector on the at least one portable stand before a performance;

(f) removing the imaging device and the projector from the at least one portable stand and removing the display from the underside of the piano lid after the performance; and (g) transporting the imaging device, the projector, and the display to another performance.

14. The method of claim 8, wherein the extension rod is portable and removable, and not permanently attached on the piano.

15. A method for the enhanced display of the hands of a pianist playing a piano, the method comprising:

(a) recording, using an imaging device, at least one video stream of at least one hand of a pianist playing a piano, the piano having a lid with an underside, the lid having at least an open position and a closed position; and (b) while the pianist is playing the piano, at least one of:

(i) using at least a portion of the underside of the lid of the piano as a display for displaying the video stream;

(ii) using at least a portion of the lid as a support structure for a display for displaying the video stream; and (iii) displaying at least a portion of the video stream within the space defined by the body and lid of the piano, when the lid is in the open position, and (c) affixing a screen to the underside of the piano lid to provide a background surface for projection, wherein step (c) comprises applying a sheet of material that clings to at least a portion of the underside of the piano lid.

16. A system for the enhanced display of the hands of a pianist playing a piano having a keyboard and a lid with an underside, the lid having at least an open position and a closed position, the system comprising:

(a) an imaging device in a position that is both above and to the side of the keyboard, such that the imaging device has a perspective view comprising the keyboard and at least one hand of the pianist, wherein closer keys appear larger than farther keys;

(b) a video recorder configured to record at least one video stream comprising at least a portion of the perspective view; and (c) a display configured to display the video stream while the pianist is playing the piano, wherein at least one of:

(i) at least a portion of the underside of the lid of the piano is configured to serve as the display;

(ii) at least a portion of the lid of the piano is configured to serve as a support structure for the display; and (iii) the display is configured to display at least a portion of the video stream within the space defined by the body and lid of the piano, when the lid is in the open position, wherein either:

(1) the keyboard displayed on the display has a trapezoidal shape, and the display's shape conforms to keyboard's trapezoidal shape, such that the display is not rectangular, and the display's shape is trapezoidal, five-sided, six-sided, or curved, such that the displayed trapezoidal keyboard fits within the display, or (2) the display's shape comprises a curve conforming to a curve of the piano lid, such that the display is not rectangular.

17. The system of claim 16, wherein the display comprises a projector configured to project the video stream on a surface of a the underside of the lid of the piano.

18. The system of claim 16, wherein the display comprises a screen affixed to the underside of the lid of the piano to provide a background surface.

19. The system of claim 17, wherein the video recorder and the projector are integrated as a unit.

20. The system of claim 19, wherein the screen is affixed to the ribs of the lid of the piano.

21. The system of claim 16, wherein the system comprises bulb and fan components operating outside the piano body and a projector head operating inside the piano body.

22. The system of claim 16, wherein the lid of the piano comprises a flat panel display for displaying the video stream.

23. The system of claim 16, further comprising an extension rod longer than the lid-support rod included as part of the piano, used to prop open the piano lid, wherein when the pianist uses the lid-support rod, the piano lid is at a first angle, and when the pianist uses the extension rod, the piano lid is at a second angle greater than the first angle, such that the projected video stream is less distorted when the extension rod is used than when the lid-support rod is used to prop up the piano lid.

24. The system of claim 16, wherein the display is a three-dimensional video display for displaying the video stream as a three-dimensional image.

25. A system for the enhanced display of the hands of a pianist playing a piano having a keyboard, the system comprising:

(a) an imaging device in a position that is both above and to the side of the keyboard, such that the imaging device has a perspective view comprising the keyboard and at least one hand of the pianist, wherein closer keys appear larger than farther keys;

(b) a video recorder configured to record at least one video stream comprising at least a portion of the perspective view, the lid having at least an open position and a closed position; and (c) a display configured to display the video stream while the pianist is playing the piano, wherein at least one of:

(i) at least a portion of the underside of the lid of the piano is configured to serve as the display;

(ii) at least a portion of the lid of the piano is configured to serve as a support structure for the display; and (iii) the display is configured to display at least a portion of the video stream within the space defined by the body and lid of the piano, when the lid is in the open position, wherein the display comprises a screen affixed to the underside of the lid of the piano to provide a background surface for projection, and wherein the screen is a sheet of material applied that clings to at least a portion of the underside of the piano lid.

26. Apparatus for the enhanced display of the hands of a pianist playing a piano having a keyboard and a lid with an underside, the lid having at least an open position and a closed position, the apparatus comprising:

(a) an imaging device in a position that is both above and to the side of the keyboard, such that the imaging device has a perspective view comprising the keyboard and at least one hand of the pianist, wherein closer keys appear larger than farther keys;

(b) a video recorder configured to record at least one video stream comprising the perspective view; and (c) a projector configured to display the video stream while the pianist is playing the piano, wherein at least one of:

(i) the video stream is displayed on at least a portion of the underside of the piano lid;

(ii) the video stream is displayed on an element coupled to the piano lid; and (iii) at least a portion of the video stream is displayed within the space defined by the body and lid of the piano, when the lid is in the open position while the pianist is playing the piano, wherein either:

(1) the keyboard displayed on the display has a trapezoidal shape, and the display's shape conforms to keyboard's trapezoidal shape, such that the display is not rectangular, and the display's shape is trapezoidal, five-sided, six-sided, or curved, such that the displayed trapezoidal keyboard fits within the display, or (2) the display's shape comprises a curve conforming to a curve of the piano lid, such that the display is not rectangular.

27. A method for the enhanced display of the hands of a pianist playing a piano, the method comprising:

(a) recording, using an imaging device, at least one video stream of at least one hand of a pianist playing a piano, the piano having a lid with an underside, the lid having at least an open position and a closed position; and (b) while the pianist is playing the piano, at least one of:

(i) using at least a portion of the underside of the lid of the piano as a display for displaying the video stream;

(ii) using at least a portion of the lid as a support structure for a display for displaying the video stream; and (iii) displaying at least a portion of the video stream within the space defined by the body and lid of the piano, when the lid is in the open position, using a projector to project the video stream on a surface of the underside of the piano lid; and (c) providing a sheet of material over at least a portion of the underside of the piano lid, the sheet forming at least a portion of the display, upon which sheet the video stream is projected.

28. The method of claim 27, further comprising:

(c) affixing a screen to the underside of the piano lid to provide a background surface for projection.

29. The method of claim 27, further comprising:

(d) propping open the piano lid using an extension rod longer than the lid-support rod included as part of the piano, wherein when the pianist uses the lid-support rod, the piano lid is at a first angle, and when the pianist uses the extension rod, the piano lid is at a second angle greater than the first angle, such that the projected video stream is less distorted when the extension rod is used than when the lid-support rod is used to prop up the piano lid.

* * * * *